US010558063B2

(12) United States Patent
Sugaya et al.

(10) Patent No.: US 10,558,063 B2
(45) Date of Patent: Feb. 11, 2020

(54) OPTICAL MODULE (71) Applicant: FURUKAWA ELECTRIC CO., LTD., Tokyo (JP)

(72) Inventors: Toshio Sugaya, Tokyo (JP); Maiko Ariga, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 15/223,594

(22) Filed: Jul. 29, 2016

(65) Prior Publication Data

US 2016/0334651 A1 Nov. 17, 2016

Related U.S. Application Data (63) Continuation of application No. PCT/JP2015/000641, filed on Feb. 12, 2015.

(30) Foreign Application Priority Data

Feb. 14, 2014 (JP) .................................. 2014-026302

(51) Int. Cl.
G02B 6/12 (2006.01)
G02B 6/42 (2006.01)
(Continued)

(52) U.S. Cl.
CPC ......... *G02F 1/025* (2013.01); *G02B 6/12004* (2013.01); *G02B 6/42* (2013.01);
(Continued)

(58) Field of Classification Search
CPC ...... G02F 1/025; G02F 1/0121; G02F 1/0327; G02F 1/0344; G02F 1/015;
(Continued)

(56) References Cited

U.S. PATENT DOCUMENTS 9,319,142 B2 * 4/2016 Kato .................... G02B 6/4213
2003/0081289 A1 5/2003 Oomori et al.
(Continued)

FOREIGN PATENT DOCUMENTS

JP 3-296288 A 12/1991
JP 5-175608 A 7/1993
(Continued)

OTHER PUBLICATIONS

English Machine Translation of JP2012-48121A.*
(Continued)

*Primary Examiner* — John Bedtelyon
(74) *Attorney, Agent, or Firm* — Oblon, McClelland, Maier & Neustadt, L.L.P.

(57) ABSTRACT

An optical module includes an optical element configured to be driven at a high frequency, a circuit board arranged at a height different from a height of the optical element, and a wiring sub-mount including a wiring electrically connecting the optical element and the circuit board, the wiring being such that a height of a connection surface of one end portion of the wiring and a height of a connection surface of another end portion of the wiring are different from each other.

11 Claims, 7 Drawing Sheets (51) Int. Cl.
*G02F 1/025* (2006.01)
*G02F 1/015* (2006.01)
*G02F 1/03* (2006.01)
*G02F 1/01* (2006.01)

(52) U.S. Cl.
CPC ............ *G02F 1/015* (2013.01); *G02F 1/0121* (2013.01); *G02F 1/0327* (2013.01); *G02F 1/0344* (2013.01)

(58) Field of Classification Search
CPC .... G02B 6/12004; G02B 6/42; G02B 6/4201; G02B 6/4203; G02B 6/4274; G02B 6/428; G02B 6/4281
See application file for complete search history.

(56) References Cited

U.S. PATENT DOCUMENTS

| | | |
|---|---|---|
| 2009/0029570 A1 | 1/2009 | Ikeuchi et al. |
| 2012/0051683 A1 | 3/2012 | Sugiyama |
| 2012/0314725 A1 | 12/2012 | Nakamishi et al. |

FOREIGN PATENT DOCUMENTS

| | | |
|---|---|---|
| JP | 9-172221 A | 6/1997 |
| JP | 10-332939 A | 12/1998 |
| JP | 2002-82321 A | 3/2002 |
| JP | 2002-299743 | 10/2002 |
| JP | 2003-17797 | 1/2003 |
| JP | 2003-110184 | 4/2003 |
| JP | 2003-110310 | 4/2003 |
| JP | 2005-128440 | 5/2005 |
| JP | 2005-234267 | 9/2005 |
| JP | 2008-187670 | 8/2008 |
| JP | 2009-204753 | 9/2009 |
| JP | 2010-040841 A | 2/2010 |
| JP | 2010-140967 A | 6/2010 |
| JP | 2010-232337 A | 10/2010 |
| JP | 2010-286770 A | 12/2010 |
| JP | 2011-028087 A | 2/2011 |
| JP | 2011-49190 | 3/2011 |
| JP | 2011-258758 A | 12/2011 |
| JP | 2012-28588 A | 2/2012 |
| JP | 2012-48121 | 3/2012 |
| JP | 2012-114362 A | 6/2012 |
| JP | 2012-252290 | 12/2012 |
| JP | 2014-17370 | 1/2014 |
| JP | 2015-55669 | 3/2015 |
| WO | WO 2012/144082 A1 | 10/2012 |

OTHER PUBLICATIONS

International Search Report dated May 12, 2015 in PCT/JP2015/000641, filed on Feb. 12, 2015 ( with English Translation).

Written Opinion dated May 12, 2015 in PCT/JP2015/000641, filed on Feb. 12, 2015.

Japanese Office Action issued in Japanese Patent Application No. 2015-562745 dated Jun. 26, 2019, (w/ English translation).

Shinji Mino et al., "High-Speed Multilevel Optical Modulators using PLC-LN Hybrid Integration Technology," NTT Technology Journal, pp. 57-61, Figs. 3 and 11 (Mar. 2011).

Japanese Office Action issued in Japanese Patent Application No. 2015-562745 dated Nov. 25, 2019 (w/ English Translation), citing references AM-AX therein.

\* cited by examiner

OPTICAL MODULE

CROSS-REFERENCES TO RELATED APPLICATIONS

This application is a continuation application of International Application No. PCT/JP2015/000641, filed on Feb. 12, 2015, which claims the benefit of Japanese Patent Application No. 2014-026302, filed on Feb. 14, 2014. The contents of the aforementioned applications are incorporated herein by reference in their entireties.

TECHNICAL FIELD

The present invention relates to an optical module including an optical element configured to be driven by a high-frequency signal.

BACKGROUND ART

To handle the increase in Internet traffic in recent years, digital coherent communication has begun to be introduced to long-distance optical communication, and the volume of communication has been progressively increasing. The next target of the digital coherence communication is middle-distance optical communication, and there have been strong demands for optical transmission-reception devices to be smaller in size and power consumption.

LN (lithium niobate) modulators are mainly used as modulators for current digital coherent communication transmitters. The size of current digital coherent transmission-reception modules is 5 inches×7 inches, which is a size large enough to accommodate an LN modulator. However, the size of the CFP2 standard, which has been studied for its introduction to middle-distance optical communication in the future, is 80 mm×40 mm, which is approximately ⅐ of the current size, and about 80 mm×20 mm, which is ½ of that size, is roughly the size of a transmission module. In practice, with the presence of a control board and the routing of fibers taken into account, the size of a transmission module is required to be kept to about 25 mm×20 mm. For this reason, a transmission-reception module of the CFP2 size cannot incorporate an LN modulator that has a size of the order of several cm.

In view of this circumstance, semiconductor modulators, which are easier to reduce the size than LN modulators, have been studied for their use as modulators for transmission modules. For example, an attempt has been started to employ a semiconductor modulator as a 100-Gbit/sec optical component to maintain the size of a transmission-reception package within the CFP2 standard.

The following is an example of related: Japanese Patent Application Laid-Open No. 2005-128440.

Meanwhile, a termination board is essential for an optical module including an optical element configured to be driven by a high-frequency signal such as a semiconductor modulator (hereinafter, referred to as "high-frequency optical element"). However, the termination board includes electronic components such as capacitors, termination resistors, and bias electrodes, and therefore needs to have a size of up to about 10 mm×mm. Hence, for a transmission module of the CFP2 standard or a smaller standard, the termination board can possibly be a factor that impedes reduction in size of the transmission module. Moreover, similar problems in size reduction also exist for various types of optical modules incorporating high-frequency optical elements other than transmission modules as described above.

SUMMARY OF THE INVENTION

An object of the present invention is to provide an optical module including a high-frequency optical element, and is to provide an optical module that can be easily reduced in size and allows easy connection to a termination board incorporated therein.

According to one aspect of the present invention, there is provided an optical module including an optical element configured to be driven at a high frequency, a circuit board arranged at a height different from a height of the optical element, and a wiring sub-mount including a wiring electrically connecting the optical element and the circuit board, the wiring being such that a height of a connection surface of one end portion of the wiring and a height of a connection surface of another end portion of the wiring are different from each other.

According to the present invention, the wiring sub-mount, which leads out the wiring in the height direction, is used to lead out the wiring to a height different from the height of the surface where the optical modulator is mounted. In this way, the circuit board such as a termination board can be arranged in a space at a height different from the height of the optical element. Hence, the degree of freedom in arrangement of the circuit board can be improved, and the size of the optical module can be reduced.

DESCRIPTION OF EMBODIMENTS

First Embodiment

An optical module according to a first embodiment of the present invention will be described with reference to FIG. 1 to FIG. 5D.

Figure 1:
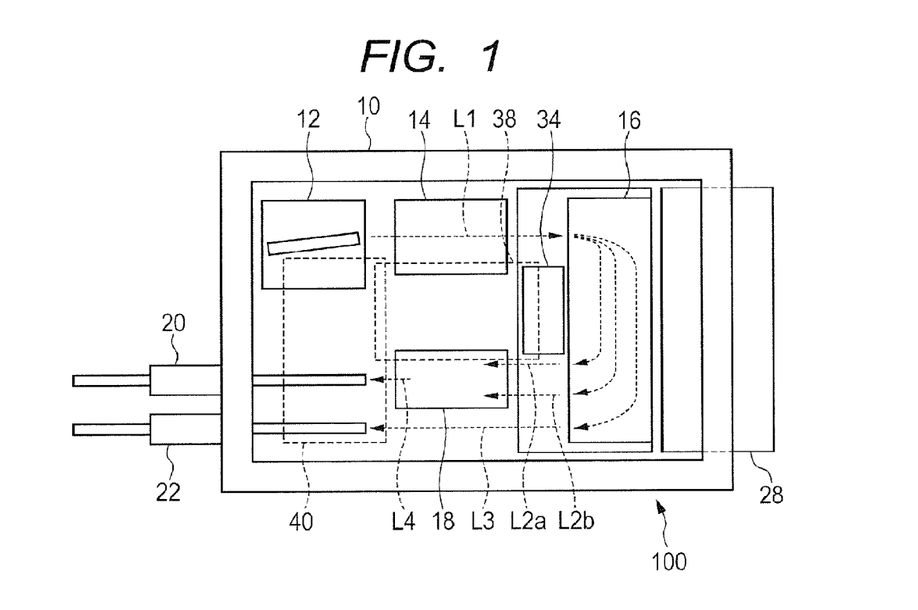
FIG. 1 is a plan view illustrating a structure of an optical module according to a first embodiment of the present invention.
Figure 2:
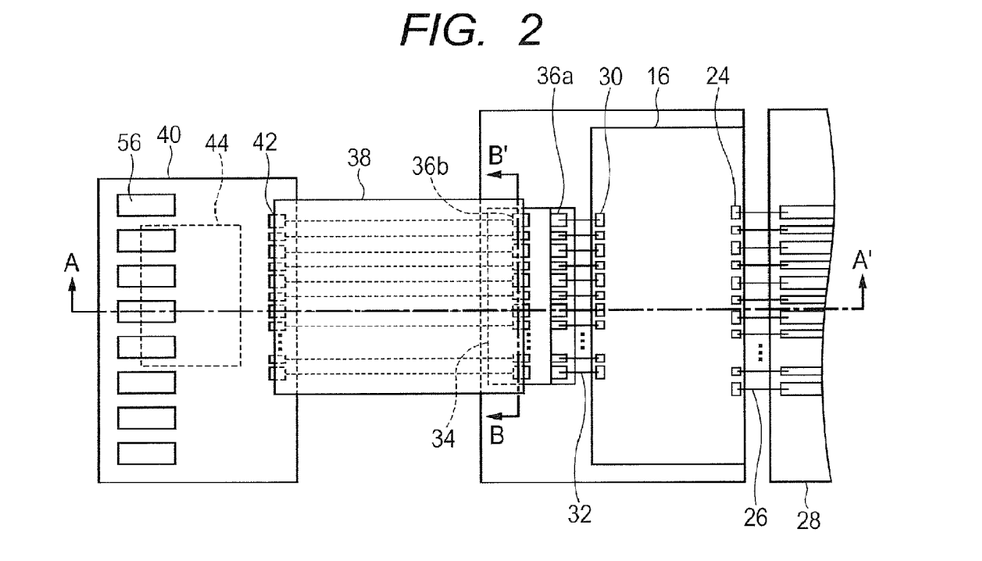
FIG. 2 is a plan view illustrating a connection between an optical modulator and a termination board in the optical module according to the first embodiment of the present invention.
Figure 3:
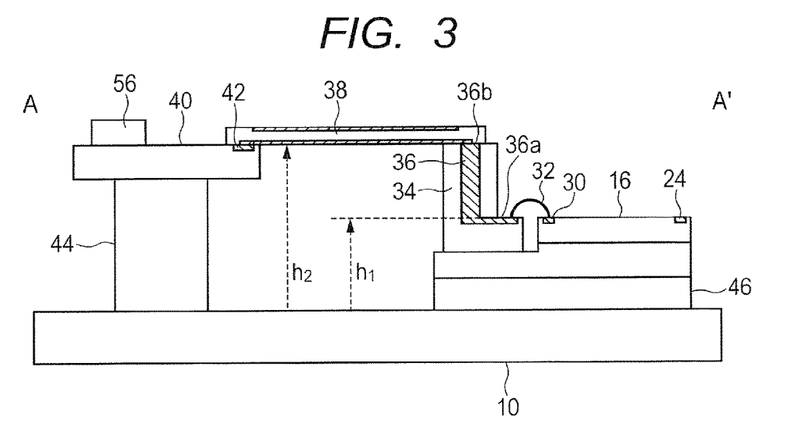
FIG. 3 is a schematic cross-sectional view illustrating the connection between the optical modulator and the termination board in the optical module according to the first embodiment of the present invention.
Figure 4A:
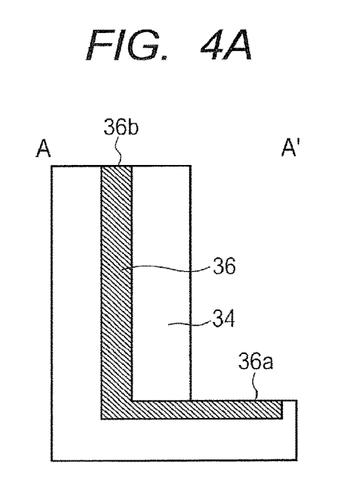
FIG. 4A and FIG. 4B are schematic cross-sectional views illustrating a structure of a wiring sub-mount used in the optical module according to the first embodiment of the present invention.
Figure 4B:
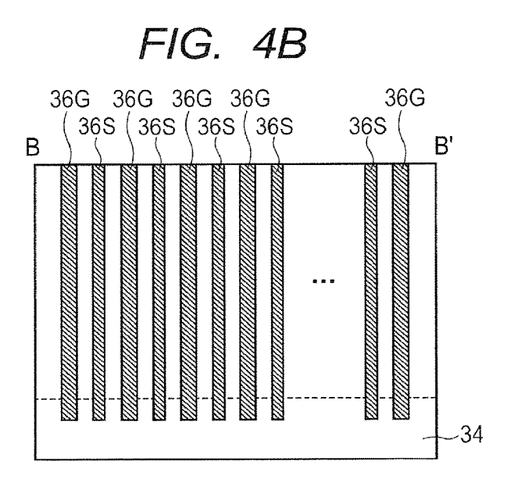
Figure 5A:
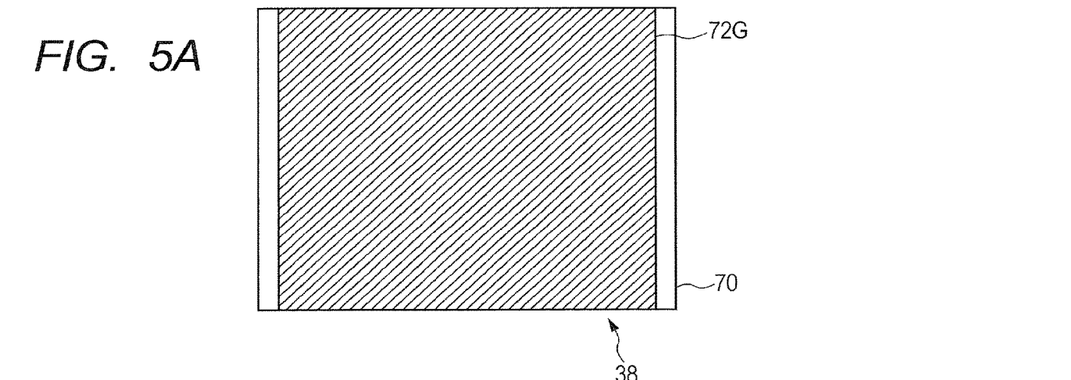
FIG. 5A and FIG. 5B are plan views illustrating a structure of a wiring board used in the optical module according to the first embodiment of the present invention.
Figure 5B:
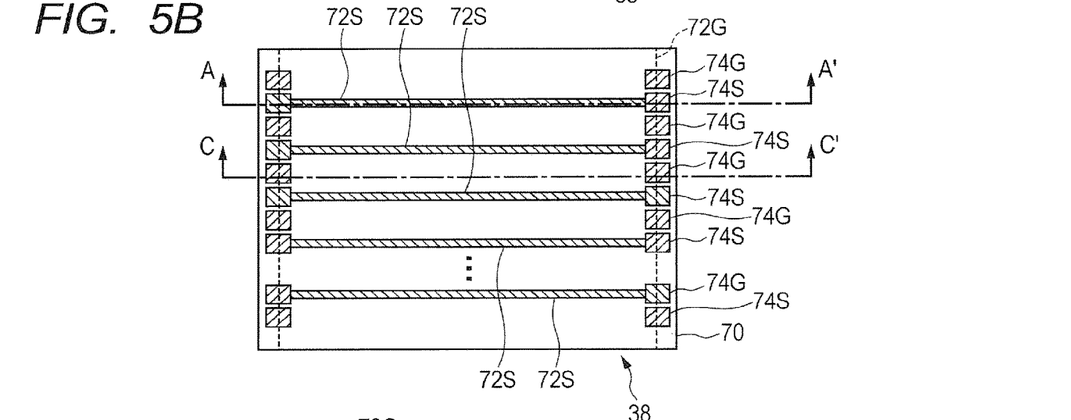
Figure 5C:
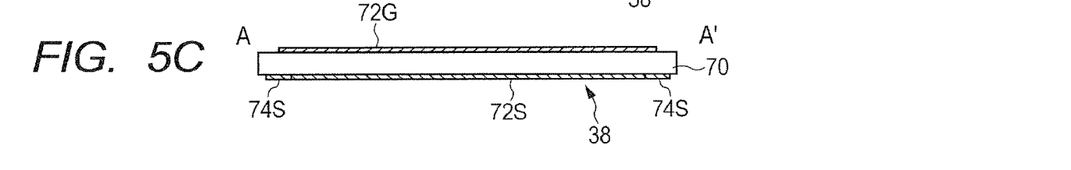
FIG. 5C and FIG. 5D are cross-sectional views illustrating the structure of the wiring board used in the optical module according to the first embodiment of the present invention.
Figure 5D:
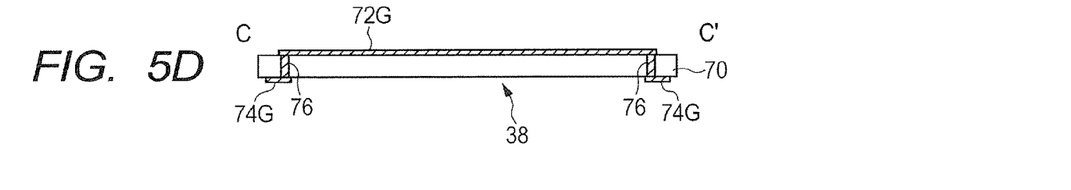

FIG. 1 is a plan view illustrating a structure of the optical module according to the present embodiment. FIG. 2 is a plan view illustrating a connection between an optical modulator and a termination board in the optical module according to the present embodiment. FIG. 3 is a schematic cross-sectional view illustrating the connection between the optical modulator and the termination board in the optical module according to the present embodiment. FIG. 4A and FIG. 4B are schematic cross-sectional views illustrating a structure of a wiring sub-mount used in the optical module according to the present embodiment. FIG. 5A and FIG. 5B are plan views illustrating a structure of a wiring board used in the optical module according to the present embodiment. FIG. 5C and FIG. 5D are cross-sectional views illustrating the structure of the wiring board used in the optical module according to the first embodiment of the present invention.

As illustrated in FIG. 1, an optical module 100 according to the present embodiment includes a laser light source 12, a wavelength locker 14, an optical modulator 16, a polarization combiner 18, and a termination board 40 inside a housing 10. In order to clearly indicate optical connection between the laser light source 12, the wavelength locker 14, the optical modulator 16, and the polarization combiner 18 (hereinafter, these will also be referred to collectively as "optical elements"), FIG. 1 illustrates with dotted lines the termination board 40 and a wiring board 38 electrically connecting the optical modulator 16 and the termination board 40 which are arranged at a height different from the height of these optical elements.

The laser light source 12 is configured to generate seed light L1 as the base of signal light to be outputted. The wavelength locker 14 is configured to monitor the output and wavelength of the seed light L1 emitted from the laser light source 12, and is arranged adjacently to a light output portion of the laser light source 12. The laser light source 12 includes a laser diode configured to emit the seed light L1 and a temperature adjustment mechanism (e.g. a thermoelectric cooler (TEC) such as a Peltier element) configured to adjust the temperature of the laser diode. The wavelength locker 14 monitors the wavelength of the seed light L1, and the thermo-electric cooler adjusts the temperature in accordance with the monitored wavelength of the seed light L1 such that the output light from the laser diode has a desired wavelength. Note that the wavelength locker 14 may include a temperature adjustment mechanism (e.g. TEC) different from that of the laser light source 12, and the thermo-electric cooler of the wavelength locker 14 may be used to make a fine adjustment such that the output light from the laser diode has the desired wavelength.

The optical modulator 16 is configured to modulate and output the seed light L1 inputted thereinto through the wavelength locker 14, and is arranged adjacently to a light output portion of the wavelength locker 14. The optical modulator 16 outputs two beams of signal light L2a, L2b modulated by changing the optical phase of the seed light L1, and local oscillation light (LO light) L3 split from the seed light L1 for use in demodulation at an optical receiver. For example, in a case where the phases of the signal light L2a and the signal light L2b are subjected to four-level modulation and optical polarization multiplexing, the signal light L2a and the signal light L2b together indicate a 8-level state. Such a modulation scheme is called Dual Polarization-Quadrature Phase Shift Keying (DP-QPSK) modulation. FIG. 1 assumes that the optical modulator 16 includes U-shaped optical waveguides such that their light incident ends and light exit ends are situated at the same end surface. Hence, the signal light L2a, the signal light L2b, and the LO light L3 exit from the same end surface as the incident end surface for the seed light L1.

Here, the wavelength locker 14 does not necessarily have to be arranged between the laser light source 12 and the optical modulator 16. For example, the wavelength locker 14, the laser light source 12, and the optical modulator 16 may be arranged in this order in a case of using backward light of the laser light source 12.

The optical modulator 16 used in the optical module in the present embodiment is a semiconductor modulator, and may be one obtained by monolithically mounting semiconductor optical amplifiers (SOAs). As in the laser light source 12, the optical modulator 16 includes a temperature adjustment mechanism configured to adjust the temperature of the semiconductor modulator so that a predetermined modulation characteristic can be obtained. High-frequency signals for modulation are inputted into an input side of the optical modulator 16 through a wiring board 28. The termination board 40 is connected to a termination side of the optical modulator 16 through a wiring sub-mount 34 which is formed of a laminated board and the wiring board 38.

The polarization combiner 18 is configured to obtain signal light L4 by combining (polarization combining) the signal light L2a and the signal light L2b, outputted from the optical modulator 16, and is arranged adjacently to a modulated-light output portion of the optical modulator 16. The polarization combiner 18 polarizes one of the signal light L2a and the signal light L2b, modulated by and outputted from the optical modulator 16, by using a half wavelength plate, and combines and outputs them as one beam of signal light L4.

Meanwhile, the optical modulator 16 may output beams of signal light differing in polarization (e.g. signal light L2a as TM mode light and signal light L2b as TE mode light), and the polarization combiner 18 may combine the polarizations of these beams of signal light.

A light output portion of the polarization combiner 18 is optically coupled to a signal-light output port 20 provided to the housing 10, and the signal light L4 can thus be outputted to the outside. Also, an LO-light output portion of the optical modulator 16 is optically coupled to an LO light output port 22 provided to the housing 10, and the LO light L3 can thus be outputted to the outside.

By arranging the optical paths from the laser light source 12 to the output ports 20, 22 into U-shapes as illustrated in FIG. 1, the size of the whole optical module can be reduced.

A controller and a power source not illustrated are connected to the laser light source 12, the wavelength locker 14, the wiring board 28, and the termination board 40. The power source may include a high-frequency power source, a DC power source, or an AC power source depending on the type of each component, and may be formed of a battery at least partly. The controller is configured to control the feed of power from the power source to each component in accordance with user operation on the controller or a program stored in advance in the controller.

FIG. 2 is a view of some constituent parts taken out from the optical module according to the present embodiment illustrated in FIG. 1, the constituent parts serving as propagation paths for high-frequency signals. FIG. 3 is a cross-sectional view taken along line A-A' in FIG. 2. Note that the high-frequency signals are signals to be used as modulation signals at the optical modulator 16.

As illustrated in FIG. 2, the optical modulator 16 is provided with input-side electrodes 24 as one end portions of high-frequency wirings for modulation not illustrated, and termination-side electrodes 30 as the other end portions of the high-frequency wirings for modulation. The termination-side electrodes 30 are arranged in the upper side of an end portion of the optical modulator 16 on the light input-output end surface side (the left side in the figure), whereas the input-side electrodes 24 are arranged in the upper side of an end portion opposite from the light input-output end surface.

The input-side electrodes 24 of the optical modulator 16 are connected to the wiring board 28 by wires 26. Thus, the high-frequency signals as modulation signals can be inputted into the optical modulator 16 through the wiring board 28. Also, the termination-side electrodes 30 of the optical modulator 16 are connected to one end portions 36a of wirings 36 in the wiring sub-mount 34 by wires 32. The other end portions 36b of the wirings 36 in the wiring sub-mount 34 are connected to electrodes 42 in the termination board 40 by the wiring board 38. Thus, the termination-side electrodes 30 of the high-frequency wirings for modulation in the optical modulator 16 and the termination board 40 are electrically connected to each other.

The termination board 40 includes electronic components such as capacitors, termination resistors, and bias electrodes. FIG. 2 and FIG. 3 illustrate only capacitors 56 as one of these electronic components. The termination board 40 is supported by a column 44 made of an insulating material such as ceramic.

Here, as illustrated in FIG. 3, the wiring sub-mount 34, connecting the optical modulator 16 and the termination board 40, is such that the connection surfaces of the one end portions 36a of the wirings 36 have a first height $h_1$ substantially equal to the height of the connection surfaces of the termination-side electrodes 30 of the optical modulator 16. Also, the wiring sub-mount 34 is such that the connection surfaces of the other end portions 36b of the wirings 36 have a second height $h_2$ greater than the first height $h_1$. Further, the wiring sub-mount 34 is such that the thickness of the portion where the other end portions 36b of the wirings 36 are arranged is greater than the thickness of the portion where the one end portions 36a of the wirings 36 are arranged. Furthermore, with the column 44, the termination board 40 is arranged such that the surface height of the electrodes 42 is substantially equal to the second height $h_2$. From a functional perspective, the wiring sub-mount 34 can be described as lead wirings through which the wirings connected to the termination-side electrodes 30 of the optical modulator 16 are lead out in the height direction.

FIG. 4A and FIG. 4B are schematic cross-sectional views illustrating the structure of the wiring sub-mount 34. FIG. 4A is a cross-sectional view of the wiring sub-mount 34 taken along line A-A' in FIG. 2. FIG. 4B is a cross-sectional view of the wiring sub-mount 34 taken along line B-B' in FIG. 2.

As illustrated in FIG. 4A and FIG. 4B, for example, the wirings 36 in the wiring sub-mount 34 are formed from the first height $h_1$ to the second height $h_2$ in such a way as to connect the one end portions 36a and the other end portions 36b. The layout of the wirings 36 in the wiring sub-mount 34 can be determined as appropriate in accordance with the arrangement of the termination-side electrodes 30 and the like. For example, in the case of FIG. 4A and FIG. 4B, signal wirings 36S and ground wirings 36G are alternately arranged in parallel with each other. Also, two signal wirings 36S and one ground wiring 36G may be alternately arranged in parallel with each other.

Note that in this specification, the "wiring sub-mount" refers to a wiring board including wirings such that the connection surfaces of their one end portions and the connection surfaces of their other end portions have mutually different predetermined heights, and having different thicknesses at the portion where the one end portions of the wirings are provided and at the portion where the other end portions of the wirings are provided. In one embodiment, as illustrated for example in FIG. 4A, the wiring sub-mount 34 is such that the end surface of the one end portion 36a of each wiring 36 and the end surface of the other end portion 36b of each wiring 36 are exposed at the same surface of the wiring sub-mount 34 (the upper side in FIG. 4A and FIG. 4B).

By using this wiring sub-mount 34, the height of the connection surfaces of the one end portions 36a of the wirings 36 and the height of the connection surfaces of the other end portions 36b of the wirings 36 can be greatly different from each other within a small floor area. Then, with the optical modulator 16 and the termination board 40 connected by using the wiring sub-mount 34, the termination board 40 can be arranged at a height different from the height of the surface where the optical elements are mounted (the bottom surface of the housing 10). In this way, the degree of freedom in arrangement of the termination board 40 can be improved as compared to a case where the termination board 40 is arranged on the same mount surface as the optical elements. Moreover, with the termination board 40 arranged to overlap an optical element, the influence of the size of the termination board 40 on the size of the whole optical module can be reduced, which in turn makes it easier to reduce the size of the optical module. In view of these, the second height $h_2$ is desirably greater than the height of the optical elements.

One might consider using a flexible wiring board instead of the wiring sub-mount 34 to connect the optical modulator 16 and the termination board 40. However, the wirings for use in propagation of the high-frequency signals are large in film thickness, and also the wirings connecting the optical modulator 16 and the termination board 40 are large in number. Thus, if a flexible wiring board is used to connect the optical modulator 16 and the termination board 40, it will be difficult to freely bend it. Thus, it is difficult to mount a flexible wiring board at a great curvature within a small space. Therefore, a flexible wiring board is not suitable if used for the purpose of size reduction.

The surface height of the one end portions 36a of the wirings 36 of the wiring sub-mount 34 and the surface height of the termination-side electrodes 30 of the optical modulator 16 are a substantially equal height, or the first height $h_1$. This offers benefits such as facilitation of the connecting of the one end portions 36a and the termination-side electrodes 30 by wire bonding. However, the surface height of the one end portions 36a of the wirings 36 and the surface height of the termination-side electrodes 30 do not necessarily have to be equal to each other, and may be different from each other. The surface height of the one end portions 36a of the wirings 36 and the surface height of the termination-side electrodes 30 can be set as appropriate with the ease of the connecting with the wires 32, high-frequency propagation characteristics, and the like taken into consideration.

The surface height of the other end portions 36b of the wirings 36 of the wiring sub-mount 34 and the surface height of the electrodes 42 of the termination board 40 are a substantially equal height, or the second height $h_2$. This also makes it easier to connect the electrodes. Moreover, a flat wiring board can be used to connect the electrodes. Note that the substantially equal height mentioned here includes a tolerance that allows the connection of the other end portions 36b of the wirings 36 and the electrodes 42 of the termination boards 40 by the wiring board. Also, the flat wiring board mentioned here is a wiring board having a flat surface on which high-frequency wirings are formed.

While the wiring board used to electrically connect the wiring sub-mount 34 and the termination board 40 is not particularly limited, a wiring board 38 illustrated in FIGS. 5A-5D can be employed, for example. The wiring board 38 illustrated in FIGS. 5A-5D includes high-frequency wirings formed of microstrip lines including a ground wiring 72G formed on one surface of a flat substrate 70 and signal wirings 72S formed on the other surface of the substrate 70. FIG. 5A is a plan view of the surface where the ground wiring 72G is formed, and FIG. 5B is a plan view of the surface where the signal wirings 72S are formed. The surface illustrated in FIG. 5B is the surface connected to the wiring sub-mount 34 and the termination board 40. Also, FIG. 5C corresponds to a cross-sectional view taken along line A-A' in FIG. 5B, and FIG. 5D corresponds to a cross-sectional view taken along line C-C' in FIG. 5B.

Predetermined connection electrodes 74 arranged in accordance with the layouts of the wirings 36 of the wiring sub-mount 34 and the electrodes 42 of the termination board 40 are provided at the connections of the wiring board 38 to the wiring sub-mount 34 and the connections of the wiring board 38 to the termination board 40, respectively. Here, FIGS. 5A-5D exemplarily illustrates a case where connection electrodes 74G to be connected to the ground wirings 36G and connection electrodes 74S to be connected to the signal wirings 36S are alternately arranged as the wiring board 38 to be connected to the wiring sub-mount 34 illustrated in FIG. 4A and FIG. 4B. As illustrated in FIGS. 5B-5D, the connection electrodes 74G, 74S are provided on the surface of the substrate 70 where the signal wirings 72S are formed. The connection electrodes 74S are provided to be connected to the opposite end portions of the signal wirings 72S. As illustrated in FIG. 5D, the connection electrodes 74G are connected to the ground wiring 72G, which is provided on the opposite surface, through contact vias 76 formed in the substrate 70. Note that while FIGS. 5A-5D illustrates the case where no ground wiring is formed on the surface where the signal wirings 72S are formed, the configuration may be such that signal wirings and ground wirings are alternately provided on that surface.

Using the wiring board 38 with high-frequency wirings formed of microstrip lines as illustrated in FIGS. 5A-5D enhances the ground and is therefore advantageous in terms of high-frequency characteristics. In particular, it is preferable to arrange the high-frequency wirings such that the distance to the ground wiring 72G from each end of the wiring board 38 in the wiring direction is equal to or greater than the distance to the connection electrodes 74G, 74S from the end of the wiring board 38 (see FIG. 5B) since such arrangement can suppress signal reflection. Note that each end in the wiring direction refers to each end of the wiring board 38 situated on lines extending from and along the signal wirings 72S. Reducing the overlap between the connection electrodes 74G, 74S and the ground wiring 72G in a plan view increases the signal reflection suppression effect. Moreover, by doing so, the configuration can be such that the overlap between the ground wiring 72G and the wirings formed in the wiring sub-mount 34 and the termination board 40 in the plan view is reduced, thereby further suppressing the signal reflection.

The wiring sub-mount 34 and the wiring board 38 do not necessarily have to be different members. For example, they may be laminated boards of an integrated structure manufactured in a continuous manner by a build-up process. Similarly, the wiring board 38 and the termination board 40 may be laminated boards of an integrated structure, and the wiring sub-mount 34, the wiring board 38, and the termination board 40 may thus be laminated boards of an integrated structure. Such an integrated structure allows for suppression of signal reflection at the connection between these members.

Note that, in view of arranging the termination board 40 at a height different from the height of the optical elements, it is conceivable to provide the termination board 40 below the optical elements. Such arrangement may be employed if there is a space that can accommodate the termination board 40 below the optical elements. However, providing the optical elements below the termination board 40 allows greater size reduction and is therefore preferable in the case of a configuration where the temperature adjustment mechanisms for the optical elements are provided between the housing and the optical elements to release heat toward the housing as in, for example, a temperature adjustment mechanism 46 for the optical modulator 16 illustrated in FIG. 3.

As described above, according to the present embodiment, the wiring sub-mount, which leads out the wirings in the height direction, is used to lead out the wirings to a height different from the height of the surface where the optical modulator is mounted. In this way, the termination board can be arranged in a space at a height different from the height of the optical elements. Hence, the degree of freedom in arrangement of the termination board can be improved, and the size of the optical module can be reduced. Moreover, the wiring sub-mount and the other component can be connected at a substantially equal height, and the components can be electrically connected to each other easily.

Second Embodiment

An optical module according to a second embodiment of the present invention will be described with reference to FIG. 6. The same constituent elements as those of the optical module according to the first embodiment illustrated in FIG. 1 to FIG. 5D will be denoted by the same reference numerals, and their description will be omitted or simplified.

Figure 6:
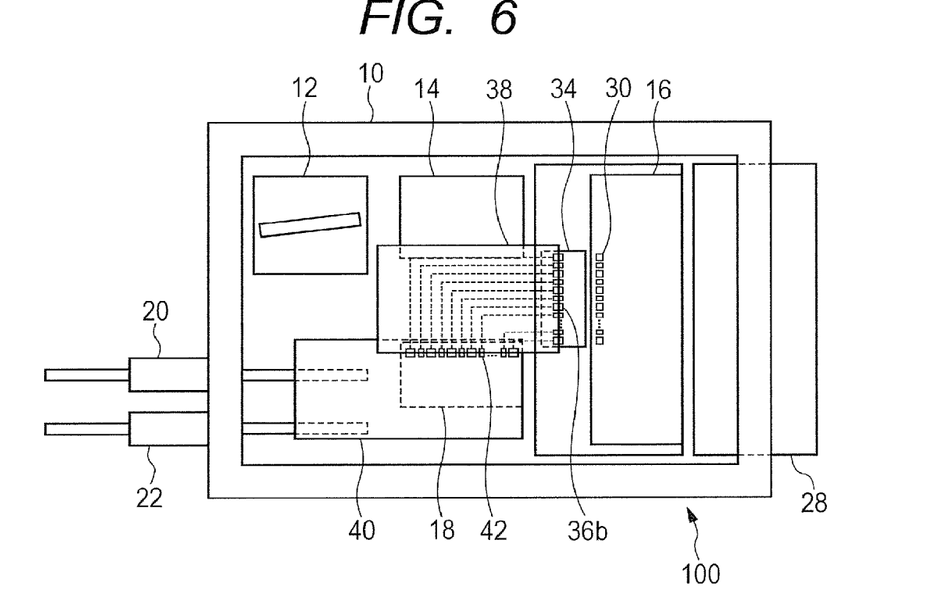
FIG. 6 is a plan view illustrating a structure of an optical module according to a second embodiment of the present invention.

FIG. 6 is a plan view illustrating a structure of the optical module according to the present embodiment.

In the optical module according to the first embodiment, the optical modulator 16 and the termination board 40 are arranged such that the side surface of the optical modulator 16 on the side where the termination-side electrodes 30 are provided and the side surface of the termination board 40 on the side where the electrodes 42 are provided face each other and are connected by the wiring sub-mount 34 and the wiring board 38. However, the positional relation between the optical modulator 16 and the termination board 40 is not limited to the above.

As illustrated in FIG. 6, in the optical module according to the present embodiment, the termination board 40 is arranged such that the side surface of the optical modulator 16 on the side where the termination-side electrodes 30 are provided and the side surface of the termination board 40 on the side where the electrodes 42 are provided are at an angle of 90 degrees. In this arrangement of the optical modulator 16 and the termination board 40 too, the termination-side electrodes 30 of the optical modulator 16 and the electrodes 42 of the termination board 40 can be electrically connected by the wiring sub-mount 34 and the wiring board 38. The high-frequency wirings of the wiring board 38, which connect the wiring sub-mount 34 and the electrodes 42, are arranged as appropriate with high-frequency characteristics (such as prevention of reflection and prevention of shift in time of the signals) taken into consideration.

Third Embodiment

An optical module according to a third embodiment of the present invention will be described with reference to FIG. 7. The same constituent elements as those of the optical modules according to the first and second embodiments illustrated in FIG. 1 to FIG. 6 will be denoted by the same reference numerals, and their description will be omitted or simplified.

Figure 7:
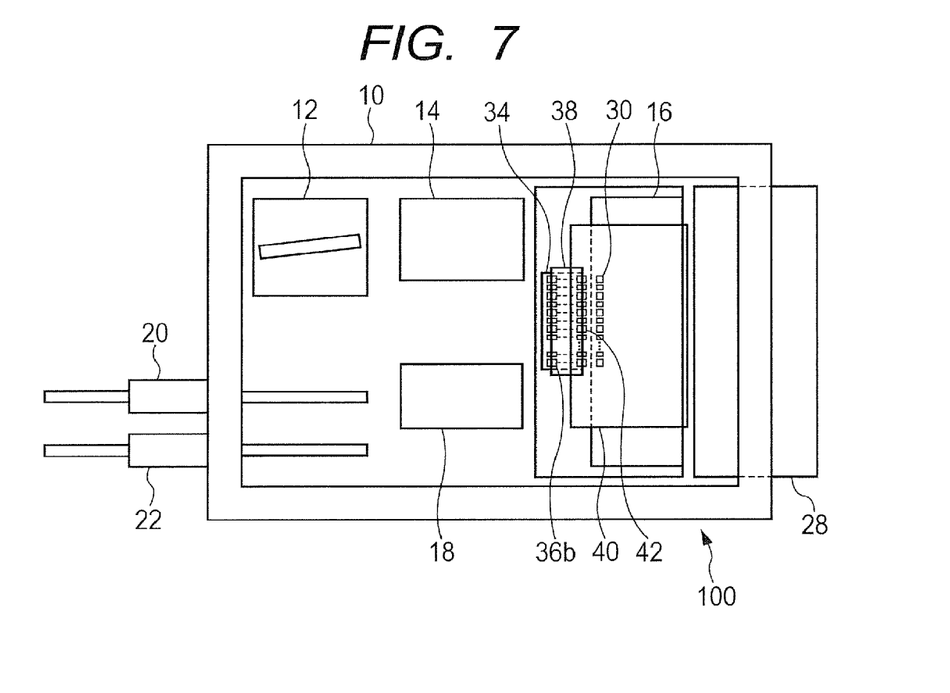
FIG. 7 is a plan view illustrating a structure of an optical module according to a third embodiment of the present invention.

FIG. 7 is a plan view illustrating a structure of the optical module according to the present embodiment.

In the optical module according to the present embodiment, the optical modulator 16 and the termination board 40 are arranged in a positional relation different from that in the optical module according to the first embodiment, as in the optical module according to the second embodiment.

Specifically, as illustrated in FIG. 7, in the optical module according to the present embodiment, the termination board 40 is arranged such that the side surface of the optical modulator 16 on the side where the termination-side electrodes 30 are provided and the side surface of the termination board 40 on the side where the electrodes 42 are provided face the same direction. In an example, this positional relation can be realized by arranging the termination board 40 over the optical modulator 16 as illustrated in FIG. 7. In this arrangement of the optical modulator 16 and the termination board 40 too, the termination-side electrodes 30 of the optical modulator 16 and the electrodes 42 of the termination board 40 can be electrically connected by the wiring sub-mount 34 and the wiring board 38. The high-frequency wirings of the wiring board 38, which connect the wiring sub-mount 34 and the electrodes 42, are arranged as appropriate with high-frequency characteristics (such as prevention of reflection and prevention of shift in time of the signals) taken into consideration.

Note that in view of improving controllability on the temperature of the optical modulator 16, a configuration in which the termination board 40, including resister elements that generate heat, is arranged away from the optical modulator 16 as in the first embodiment and the second embodiment is more desirable than the configuration in the present embodiment, in which the termination board 40 is arranged over the optical modulator 16.

Fourth Embodiment

An optical module according to a fourth embodiment of the present invention will be described with reference to FIG. 8. The same constituent elements as those of the optical modules according to the first to third embodiments illustrated in FIG. 1 to FIG. 7 will be denoted by the same reference numerals, and their description will be omitted or simplified.

Figure 8:
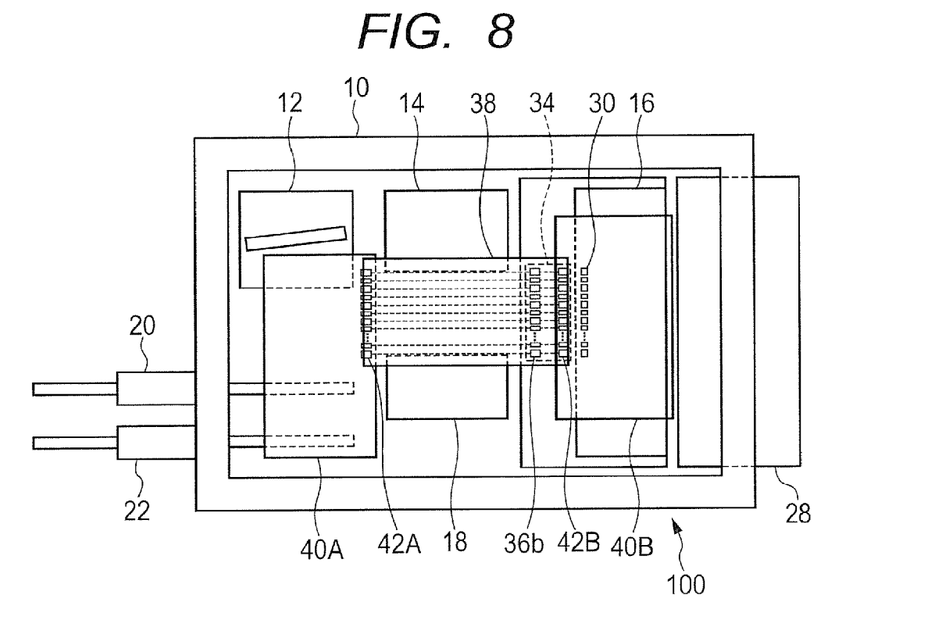
FIG. 8 is a plan view illustrating a structure of an optical module according to a fourth embodiment of the present invention.

FIG. 8 is a plan view illustrating the structure of the optical module according to the present embodiment.

In the optical modules according to the first to third embodiments, one termination board 40 is provided. However, the number of termination boards 40 does not necessarily have to be one. Specifically, the termination board 40 may be divided into two, three, or more blocks and arranged.

As illustrated in FIG. 8, in the optical module according to the present embodiment, two termination boards 40A, 40B are provided, and they are electrically connected to the optical modulator 16 by the wiring board 38 and the wiring sub-mount 34. The wiring sub-mount 34 and the termination boards 40A, 40B are connected by the wiring board 38 including high-frequency wirings connecting portions of the wirings 36 and electrodes 42A of the termination board 40A, and high-frequency wirings connecting other portions of the wirings 36 and electrodes 42B of the termination board 40B. Dividing the termination board 40 into a plurality of blocks can further improve the degree of freedom in arrangement of the termination board 40.

The arrangement of the termination boards 40A, 40B is not limited to the arrangement illustrated in FIG. 8, but may be selected as appropriate in accordance with the arrangement of other constituent components and the like. Also, the termination boards 40A, 40B may be connected by different wiring sub-mounts 34 and/or different wiring boards 38. Moreover, the termination board 40 may be divided into three or more blocks. The high-frequency wirings of the wiring board 38, which connect the wiring sub-mount 34 and the electrodes 42A, 42B, are arranged as appropriate with high-frequency characteristics (such as prevention of reflection and prevention of shift in time of the signals) taken into consideration.

Fifth Embodiment

An optical module according to a fifth embodiment of the present invention will be described with reference to FIG. 9. The same constituent elements as those of the optical modules according to the first to fourth embodiments illustrated in FIG. 1 to FIG. 8 will be denoted by the same reference numerals, and their description will be omitted or simplified.

Figure 9:
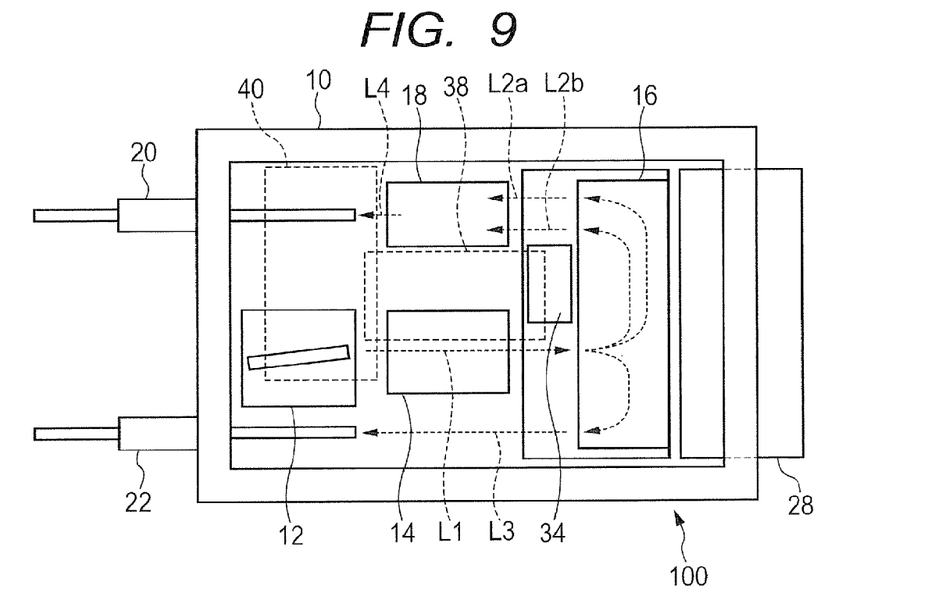
FIG. 9 is a plan view illustrating a structure of an optical module according to a fifth embodiment of the present invention.

FIG. 9 is a plan view illustrating the structure of the optical module according to the present embodiment.

The optical module according to the present embodiment is similar to the optical modules according to the first to fourth embodiments except that the arrangement of the optical elements, specifically, the optical paths from the laser light source 12 to the output ports 20, 22 are different.

In the optical module according to the present embodiment, as in the first embodiment, the laser light source 12, the wavelength locker 14, the optical modulator 16, and the polarization combiner 18 are arranged such that the optical paths formed by these form U shapes. However, in the optical module according to the present embodiment, when the seed light L1 is split in the optical modulator 16, the seed light L1 to be the signal light L2a, L2b and the seed light L1 to be the LO light L3 are bent in different directions in the optical modulator 16. Specifically, the seed light L1 to be the signal light L2a, L2b propagates inside the optical modulator 16 through optical waveguides in such a way as to form a U-shape in the counterclockwise direction in the figure while being modulated into the signal light L2a, L2b. On the other hand, the seed light L1 to be the LO light L3 propagates inside the optical modulator 16 through an optical waveguide in such a way as to form a U-shape in the clockwise direction in the figure, and is outputted as the LO light L3.

As in the first embodiment, the size of the whole optical module can be reduced also when the optical paths from the laser light source 12 to the output port 20 and the optical path from the laser light source 12 to the output port 22 are arranged to form different U shapes as illustrated in FIG. 9.

Sixth Embodiment

An optical module according to a sixth embodiment of the present invention will be described with reference to FIG. 10. The same constituent elements as those of the optical modules according to the first to fifth embodiments illustrated in FIG. 1 to FIG. 9 will be denoted by the same reference numerals, and their description will be omitted or simplified.

Figure 10:
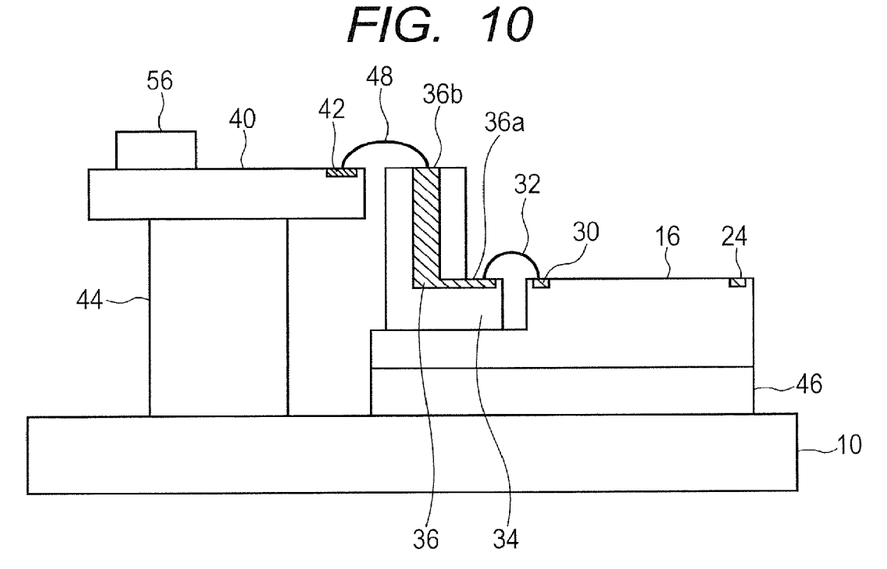
FIG. 10 is a schematic cross-sectional view illustrating a structure of an optical module according to a sixth embodiment of the present invention.

FIG. 10 is a schematic cross-sectional view illustrating the structure of the optical module according to the present embodiment.

In the optical modules according to the first to fifth embodiments, the wiring sub-mount 34 and the termination board 40 are electrically connected by the wiring board 38. However, the wiring sub-mount 34 and the termination board 40 do not necessarily have to be electrically connected by the wiring board 38.

As illustrated in FIG. 10, in the optical module according to the present embodiment, the wiring sub-mount 34 and the termination board 40 are electrically connected by wires 48. In a case where the wiring sub-mount 34 and the termination board 40 are arranged close to each other as in FIG. 10 or other similar cases, the wiring sub-mount 34 and the termination board 40 can be electrically connected by a simple method such as wire bonding, without greatly lowering high-frequency propagation characteristics.

Seventh Embodiment

An optical module according to a seventh embodiment of the present invention will be described with reference to FIG. 11 to FIG. 14. The same constituent elements as those of the optical modules according to the first to sixth embodiments illustrated in FIG. 1 to FIG. 10 will be denoted by the same reference numerals, and their description will be omitted or simplified.

FIG. 11 to FIG. 14 are schematic cross-sectional views illustrating some structures of the wiring sub-mount of the optical module according to the present embodiment.

The wiring sub-mounts 34 used in the optical modules according to the first to sixth embodiment are not necessarily limited to the wiring sub-mount illustrated in FIG. 4A and FIG. 4B. Other examples of the wiring sub-mount 34 include wiring sub-mounts illustrated in FIG. 11 to FIG. 14, for instance.

Figure 11:
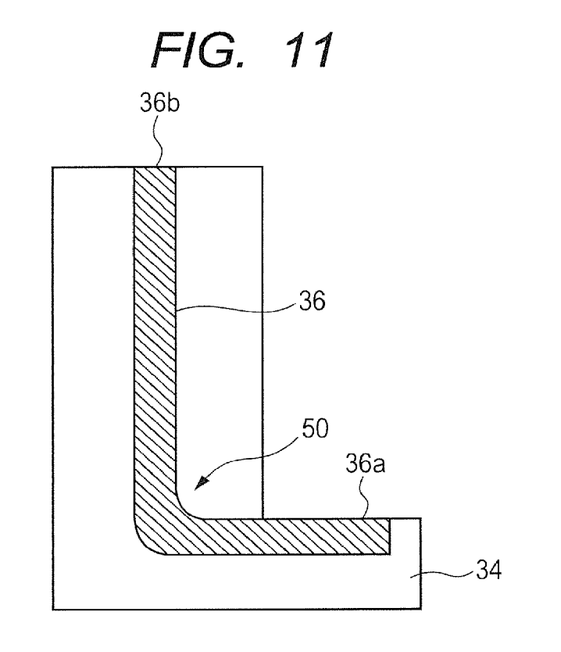
FIG. 11, FIG. 12, FIG. 13 and FIG. 14 are schematic cross-sectional views illustrating structures of a wiring sub-mount used in the optical module according to a seventh embodiment of the present invention.

The wiring sub-mount 34 illustrated in FIG. 11 is such that a bent portion 50 of each wiring 36 in the wiring sub-mount 34 is rounded to form a curved surface. Rounding and smoothing the bent portion 50 of the wiring 36 can suppress reflection of the high-frequency signal at the bent portion 50.

Figure 12:
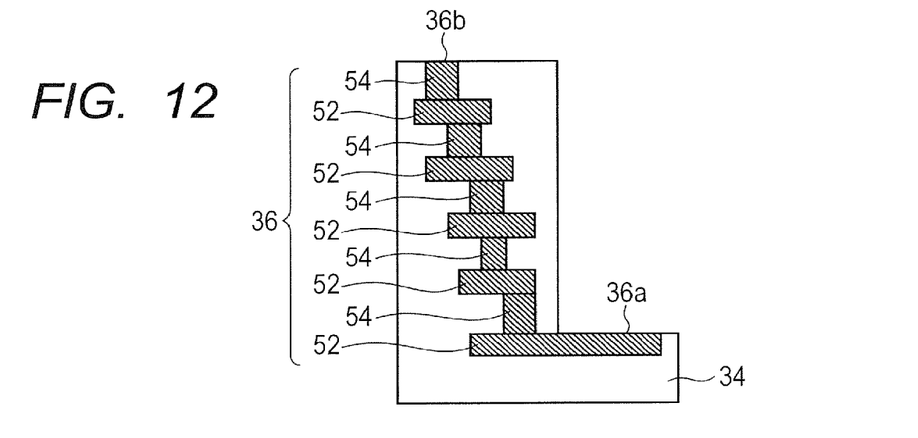

The wiring sub-mount 34 illustrated in FIG. 12 is such that each wiring 36 is formed of a laminated board obtained by alternately laminating pad portions 52 and via portions 54. Depending on the height of the wiring sub-mount 34, it is assumed to be difficult to bore its ceramic base material at once. By forming the wiring 36 by alternately laminating the pad portions 52 and the via portions 54, even a tall wiring sub-mount 34 can be easily manufactured. Note that the number of laminated pad portions 52 and via portions 54 in FIG. 12 is an example and can be increased or decreased as appropriate in accordance with the required height of the wiring sub-mount 34.

Figure 13:
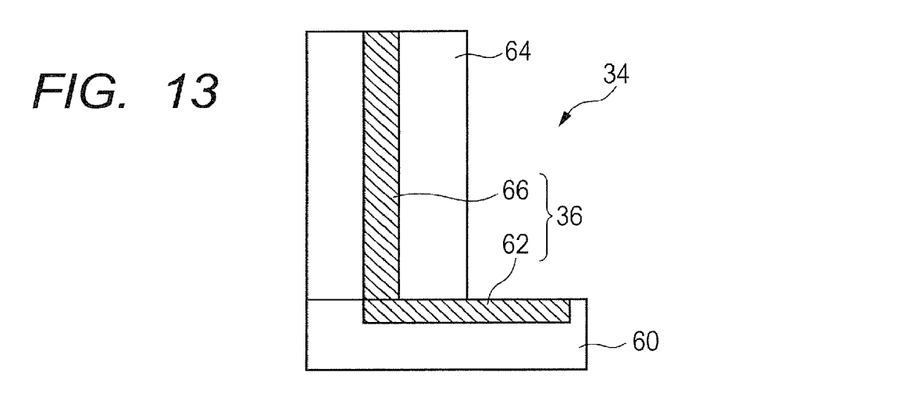

The wiring sub-mount 34 illustrated in FIG. 13 is a laminated wiring board including a first board 60 in which are buried first wiring portions 62 extending in a direction parallel to the surface where the optical elements are mounted, and a second board 64 in which are buried second wiring portions 66 extending in a direction crossing the surface where the optical elements are mounted. The wiring sub-mount 34 can be manufactured by joining the second board 64 to the upper side of the first board 60 such that the first wiring portions 62 and the second wiring portions 66 are connected.

Figure 14:
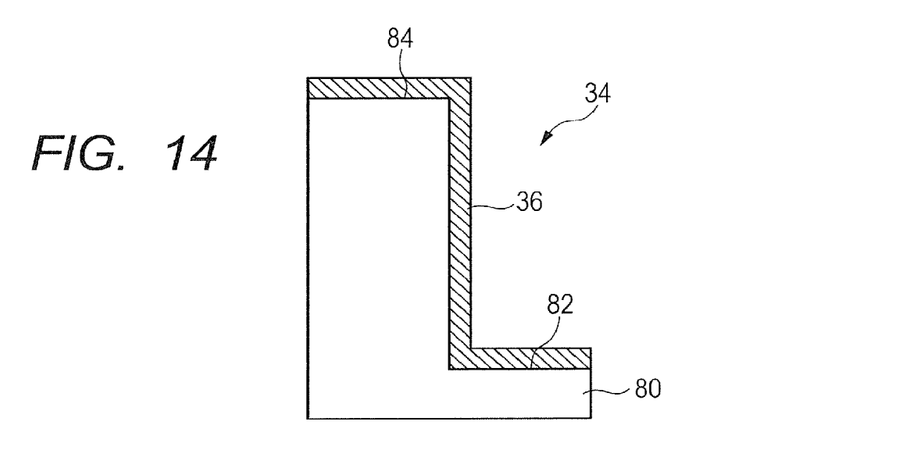

The wiring sub-mount 34 illustrated in FIG. 14 is such that each wiring 36 is formed on surfaces of a substrate 80 having two upper surfaces 82, 84 differing in height, the wiring 36 being formed from the upper surface 82 to the upper surface 84. A bent portion as that in FIG. 11 may be provided at the corner of the substrate 80 at which the substrate 80 rises vertically from the upper surface 82 toward the upper surface 84, and at the corner of the substrate 80 at which the substrate 80 declines vertically from the upper surface 84 toward the upper surface 82.

[Modifications]

The present invention is not limited to the above embodiments but may be modified in various ways.

For example, in the above embodiments, transmission modules that can be utilized as optical transmission-reception modules for digital coherent communication have been described as examples of an optical module including high-frequency optical elements. However, the optical module including high-frequency optical elements is not limited to these but is widely applicable to general optical modules including high-frequency optical elements. Examples of other optical modules including high-frequency optical elements include optical modules including a laser light source and an optical modulator.

Also, in the above embodiments, the laser light source and the optical modulator are independent components. However, an optical semiconductor element in which a laser light source and an optical modulator are integrally formed may be used.

Also, in the above embodiments, the optical modules have been described in which the termination board 40 is arranged at a height different from the height of the surface where the optical elements are mounted. However, the board arranged at a height different from the height of the surface where the optical elements are mounted is not limited to the termination board 40. For example, an electric circuit board other than the termination board, e.g. a control board including a drive circuit for driving the optical elements may be arranged at a height different from the height of the surface where the optical elements are mounted. A plurality of types of electric circuit boards including the termination board 40 may be arranged at a height different from the height of the surface where the optical elements are mounted. In these cases too, a wiring sub-mount similar to the wiring sub-mount 34 can be used to connect the boards arranged at the different heights.

What is claimed is:

1. An optical module comprising:
   an optical path formed by a laser light source, a wavelength locker, a semiconductor optical modulator configured to be driven at a high frequency, and a polarization combiner;
   a circuit board arranged at a height higher than a height of the optical path;
   a wiring sub-mount including a wiring electrically connecting the optical element to the circuit board, such that a height of a connection surface of one end portion of the wiring connected to the circuit board is higher than a height of a connection surface of another end portion of the wiring connected to the optical element; and
   a housing,
   wherein the optical path, the circuit board, and the wiring sub-mount are arranged in a continuous space defined by the housing.

2. The optical module according to claim 1, wherein the wiring includes
   a first wiring portion extending in a direction parallel to a surface where the semiconductor optical modulator is mounted, and
   a second wiring portion connected to the first wiring portion and extending in a direction crossing the surface where the semiconductor optical modulator is mounted.

3. The optical module according to claim 2, wherein a curved surface is formed on a connection between the first wiring portion and the second wiring portion of the wiring.

4. The optical module according to claim 1, further comprising:
   a wiring board electrically connecting the wiring sub-mount to the circuit board.

5. The optical module according to claim 4, wherein
   the wiring board includes microstrip lines including a signal wiring formed on one surface of a substrate and a ground wiring formed on another surface of the substrate,
   the signal wiring includes a connection electrode provided at each of connections to the wiring sub-mount and the circuit board, and
   the ground wiring and the connection electrode are arranged such that a distance to the ground wiring from an end of the wiring board in a wiring direction is equal to or greater than a distance to the connection electrode from the end of the wiring board.

6. The optical module according to claim 4, wherein the wiring sub-mount, the circuit board, and the wiring board are an integrated structure.

7. The optical module according to claim 1, wherein the wiring sub-mount and the circuit board are electrically connected by a wire.

8. The optical module according to claim 1, wherein the optical path is arranged to form a U-shape.

9. The optical module according to claim 1, wherein the wiring sub-mount is a laminated board.

10. The optical module according to claim 1, wherein the circuit board includes a termination resistor.

11. The optical module according to claim 1, wherein the housing has a length of not more than 80 mm and a width of not more than 20 mm.

* * * * *